United States Patent [19]
Amaya et al.

[11] Patent Number: 5,973,390
[45] Date of Patent: Oct. 26, 1999

[54] CHIP ELECTRONIC PART

[75] Inventors: Keishiro Amaya, Fukui; Kenichi Aoki, Takefu, both of Japan

[73] Assignee: Murata Manufacturing Co., Ltd., Nagaokakyo, Japan

[21] Appl. No.: 08/921,508

[22] Filed: Sep. 2, 1997

[30] Foreign Application Priority Data

Sep. 2, 1996 [JP] Japan .................................... 8-231723

[51] Int. Cl.$^6$ .................................................. H01L 23/02
[52] U.S. Cl. ........................... 257/678; 257/924; 338/310
[58] Field of Search ..................... 257/924, 678; 338/309, 310

[56] References Cited

U.S. PATENT DOCUMENTS 4,434,416  2/1984  Schonberger ........................... 338/309
5,757,076  5/1998  Kambara ................................. 257/924

*Primary Examiner*—Carl Whitehead, Jr.
*Assistant Examiner*—Roy Potter
*Attorney, Agent, or Firm*—Burns, Doane, Swecker & Mathis, LLP

[57] ABSTRACT

The present invention is a chip electronic part having: a ceramic member; a conductor pattern formed on the surface of the ceramic member; an insulating protective layer formed on the conductor pattern; an external electrode which is formed at least one end face of the ceramic member, electrically connected to the conductor pattern, and composed of an undercoating layer formed by dry plating and at least one plating layer formed by wet plating; and at least one groove formed near an end face of the insulating protective layer so as to limit the formation of the undercoating layer.

6 Claims, 4 Drawing Sheets

CHIP ELECTRONIC PART

BACKGROUND OF THE INVENTION

1. Field of the Invention

The present invention relates to chip electronic parts used in chip inductors, chip coils, chip capacitors, etc.

2. Description of the Related Art

Conventionally, the rectangular chip coil shown in FIG. 8 has been known in the art. This type of chip coil has the following structure: a coil pattern 2 and leading electrodes 3 are formed on a ceramic member 1; an insulating protective layer 4 covers the entire face of the coil pattern 2 and portions of the leading electrodes 3; external electrodes 5 electrically connected to the corresponding leading electrodes 3 are formed on the corresponding end faces of the ceramic member 1. Each of the external electrodes 5 is composed of: a Cr undercoating layer 5a formed by dry plating such as sputtering; and a Ni plating layer 5b and a solder plating layer 5c, both produced by wet electrolytic plating.

According to the above conventional chip coil, when the undercoating layers 5a are formed on the corresponding end faces of the ceramic member 1 by dry plating, e. g. sputtering, a sputtering material inevitably extends to the upper and lower faces of the ceramic member 1 and the plating layers 5b and 5c are formed thereon by electrolytic plating. In this case, the length of the upper extension E1 and that of the lower extension E2 are the same in each of the external electrodes 5. A certain length of the lower extension E2 is required to solder the external electrodes 5 to a print substrate. Thus, the length of the upper extension E1 is correspondingly increased to ensure a certain length of the lower extension E2.

However, an increase in the size of the upper extension E1 leads to a decrease in the effective area for forming a conductor pattern on the ceramic member, which fact is a great problem because small-sized electronic parts are in demand nowadays. Further, the size of the upper extension E1 alters according to the shape of the conductor pattern or the insulating protective layer, and the electrical characteristics thereby undesirably deteriorate or vary widely due to, e.g., inductive coupling between the pattern coil 2 and the upper extension E1 of the external electrode 5.

Conventional chip electronic parts are prepared as follows: A large-area ceramic base material is partitioned into portions by primary dividing grooves and secondary dividing grooves running in the transverse and longitudinal directions, respectively, and a conductor pattern and an insulating protective layer are formed in each portion according to a matrix pattern. After obtaining stick-shaped base material by primary-cutting the ceramic base material along the primary dividing grooves, the external electrodes are provided on the corresponding end faces, in which process a sputtering material of the undercoating layer enters into the secondary dividing grooves and plating layers are further formed thereon. As a result, the external electrodes are formed also in the secondary dividing grooves, and the electrical characteristics of the device thereby undesirably deteriorate or vary widely.

SUMMARY OF THE INVENTION

Accordingly, an object of the present invention is to provide a chip electronic part which can prevent external electrodes from greatly extending to the upper face of a ceramic member and/or largely entering into the secondary dividing grooves.

To solve the above object, a chip electronic part of the present invention is provided with at least one groove formed near an end face of an insulating protective layer so as to prevent the formation of an undercoating layer of the external electrode, which insulating protective layer is formed on the surface of the ceramic member to cover a conductor pattern.

The slope of the groove is not entirely covered with the undercoating layer by dry plating; thus the plating layer is not formed on the groove by dry plating. Following the dry plating step is a wet plating step, carried out on the undercoating layer to complete the plating layer. In other words, the extension of the external electrode is cut by the slope of the groove, thereby decreasing the length of the upper extension or the amount of the electrode entering into the secondary dividing grooves.

DESCRIPTION OF THE PREFERRED EMBODIMENTS

The present invention will be better understood from the following embodiments taken in conjunction with the accompanying drawings.

The First Embodiment

A chip electronic part incorporated in the first embodiment of the present invention will be explained in detail with reference to FIGS. 1 to 3.

Figure 1:
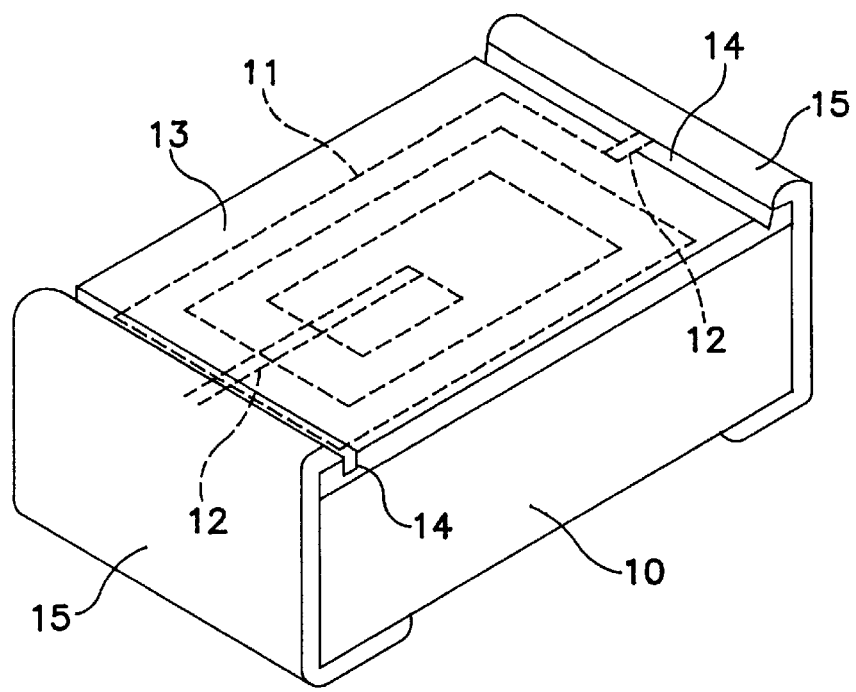
FIG. 1 is a perspective view of a chip electronic part incorporated in the first embodiment of the present invention.
Figure 2:
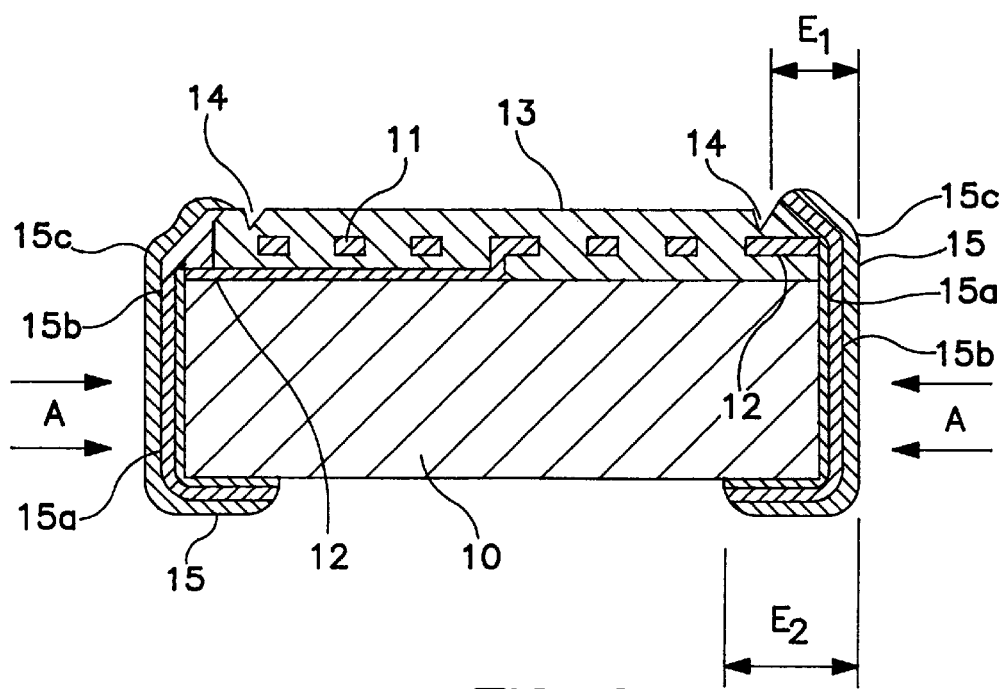
FIG. 2 is a sectional view of the chip electronic part shown in FIG. 1.
Figure 3:
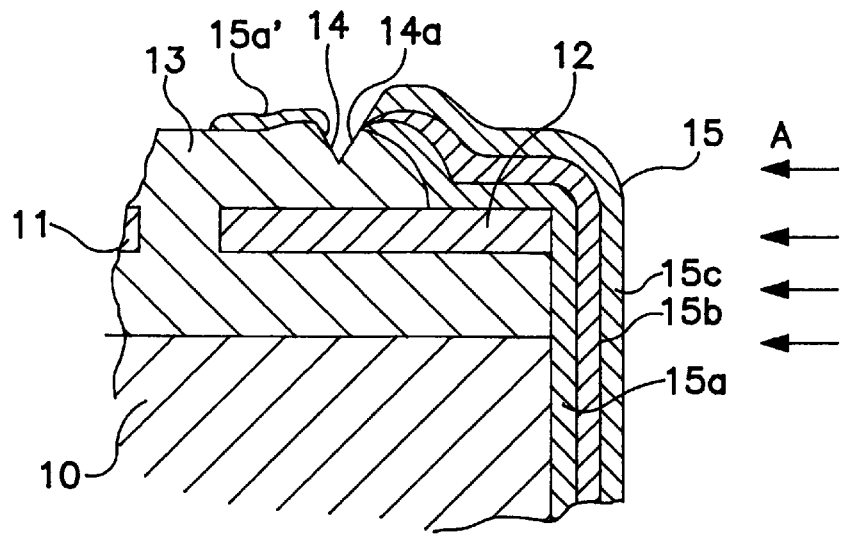
FIG. 3 is a fragmentary enlarged sectional view of the chip electronic part shown in FIG. 1.

A rectangular ceramic member 10, a coil pattern 11, an insulating protective layer 13, and an external electrodes 15 are shown in FIGS. 1 and 2. The coil pattern 11 is formed in a spiral-shape on the surface of the ceramic member 10 by a photolithographic method, for example. Leading electrodes 12, leading to the corresponding end faces of the ceramic member 10, connect to the corresponding ends of the coil pattern 11. The insulating protective layer 13 is prepared from a polyimide resin during the step for forming the coil pattern 11 by the photolithographic method. Grooves 14 running from one side to the other side of the ceramic member 10 are provided near the corresponding end faces of the insulating protective layer 13, as is shown in the figures.

Each of the external electrodes 15 is composed of: an undercoating layer 15a formed from Cr or Ni—Cr according to dry plating such as sputtering, ion-plating, deposition, etc.; a second layer 15b produced from Ni by wet plating such as electrolytic plating; and a third layer 15b produced by wet plating such as electrolytic plating. The length of the lower extension E2 of each of the external electrodes 15 on the lower face of the ceramic member 10 is the same as that of conventional chip electronic parts. However, the upper extension E1 on the upper face of the ceramic member 10 is short because each upper extension is cut by the corresponding groove 14.

This fact is explained as follows: During sputtering, the sputtering material is sputtered along the direction of the arrows A in FIGS. 2 and 3 to form the undercoating layers 15a on the corresponding end faces of the ceramic member 10. As is shown in FIG. 3, each undercoating layer 15a is cut by a slope 14a of the groove 14 because the extension of the sputtering material is prevented by the slope 14a. The second layer 15b and the third layer 15c are then formed on the undercoating layer 15a by electrolytic plating. However, they are not plated on the part of the undercoating layer 15a' which is separated from the undercoating layer 15a because the potential applied during the electrolytic process to the undercoating layer 15 is not applied to the cut-off undercoating layer 15' on the surface of the insulating protective layer 13. Therefore, the length of the upper extension E1, which is cut by the corresponding groove 14, of each external electrode 15 is reduced as compared with that of conventional chip electronic parts.

In the first embodiment, the length of the upper extension E1 of each of the external electrodes 15 can be reduced. Therefore, the coil pattern 11 can be formed while effectively utilizing the upper surface of the ceramic member 10, and also, the upper extension E1 does not result in deterioration or variation in the electrical characteristics. In addition, a satisfactory length of lower extension E2 can be ensured so that the external electrodes 15 can be soldered to a print substrate or the like without trouble.

The Second Embodiment

The second embodiment of the present invention will be explained in detail with reference to FIGS. 4 to 6. The numerals in the different views identify substantially identical parts in the above embodiment, and detailed explanations thereof are omitted.

Figure 4:
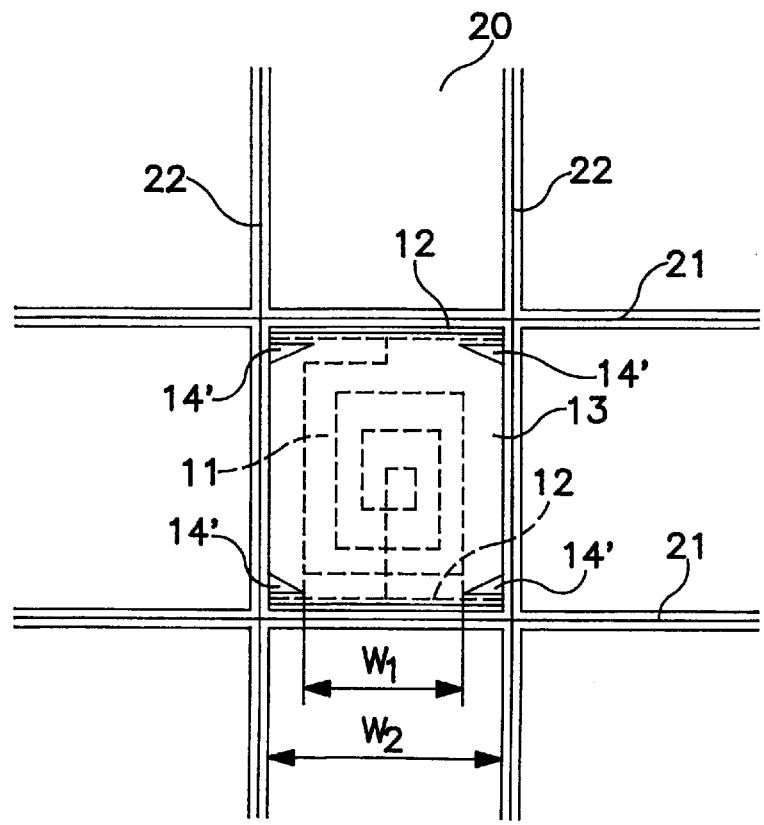
FIG. 4 is a plan view of a base material (before cutting into portions) of a chip electronic part incorporated in the second embodiment of the present invention.
Figure 5:
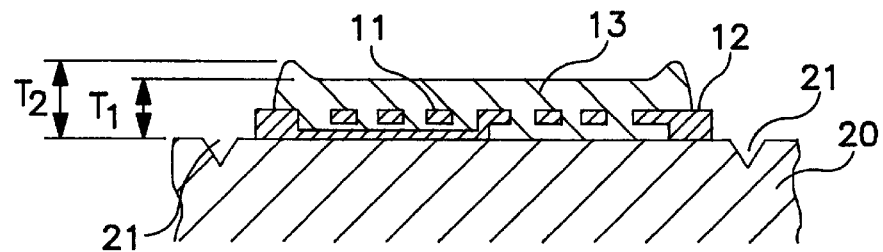
FIG. 5 is a sectional view of the base material (before cutting into portions) shown in FIG. 4.

The above-described chip electronic part is prepared as follows: a large-area ceramic base material 20 is partitioned into portions by primary dividing grooves 21 and secondary dividing grooves 22 running in the transverse and longitudinal directions, respectively; a coil pattern 11 and an insulating protective layer 13 are formed in each portion according to a matrix pattern, as is shown in FIG. 4. The width W1 of the coil pattern 11 is not wider than the width W2 of the leading electrodes 12. The thickness T1 of the insulating protective layer 13 corresponding to the coil pattern 11 is not thicker than the thickness T2 of the insulating protective layer 13 corresponding to the leading electrodes 12, as is shown in FIG. 5. Therefore, the thickness of the external electrodes 15 does not exceed the thickness T2.

Figure 6:
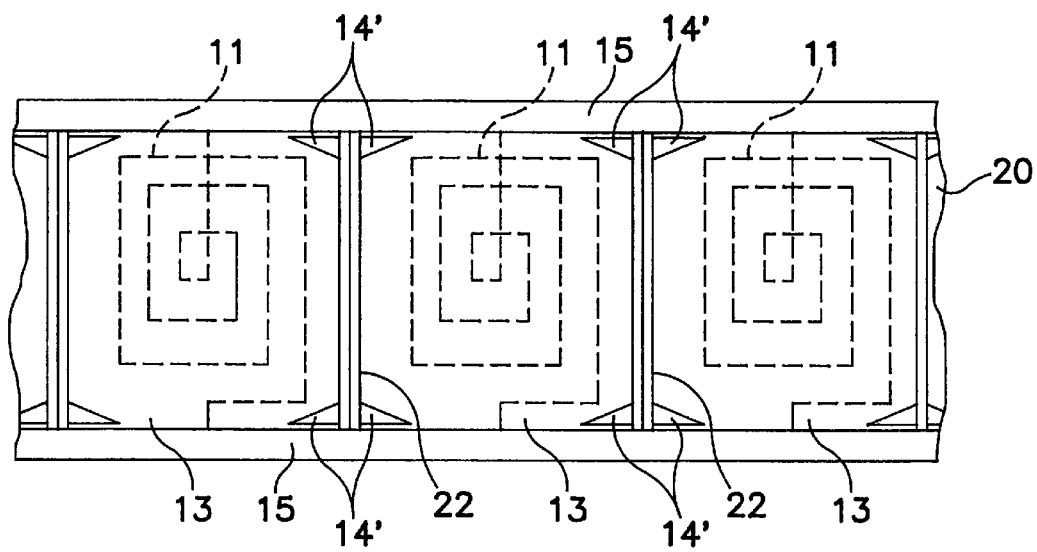
FIG. 6 is a plan view of the base material after primary-cutting.
Figure 7:
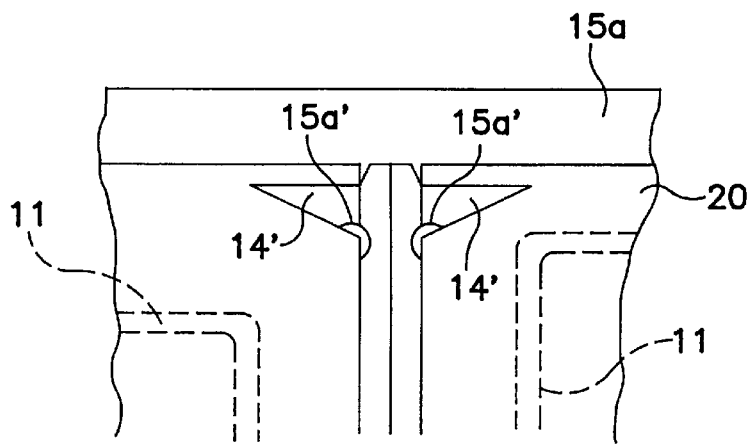
FIG. 7 is a fragmentary enlarged sectional view of the base material (after primary-cutting) shown in FIG. 6.
Figure 8:
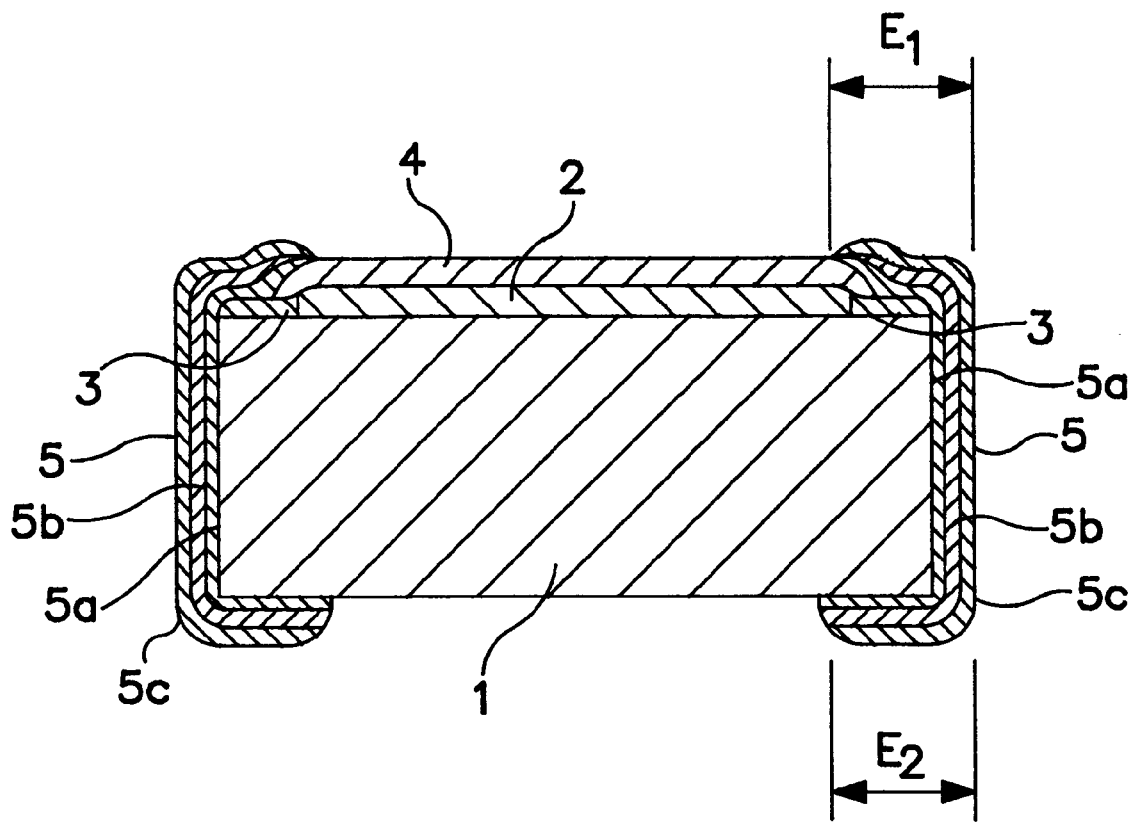
FIG. 8 is a sectional view of a conventional chip electronic part.

After obtaining stick-shaped base material by primary-cutting the ceramic base material 20 along the primary dividing grooves 21 running in the transverse direction, as is shown in FIG. 6, the external electrodes 15 are provided on the corresponding end faces, in which process a sputtering material of the undercoating layer 15a enters into the secondary dividing grooves 22. However, since each corner of the insulating protective layer 13 has a groove 14', undercoating layers 15a' are separated from the undercoating layers 15a by the corresponding grooves 14', as is shown in FIG. 7. The groove 14' can be a widened portion of the groove 14 which restricts the width of the external electrode 15 of the first embodiment. Therefore, when a second layer 15b and a third layer 15c are formed on each of the undercoating layers 15a by electrolytic plating, they are not plated on the undercoating layers 15a'. Conventionally, an external electrode 5 is monolithically formed with the undercoating layers 5a, thereby exerting adverse electrical effects on the coil pattern 11. However, in the second embodiment, deterioration or variation in the electrical characteristics does not occur because the external electrodes 15 are cut by the corner grooves 14'.

Other Embodiments

Chip electronic parts incorporated in the present invention are not restricted to the above embodiments, and variations and modifications can be effected within the spirit and scope of the invention.

In particular, not only a coil pattern but also patterns having various electrical characteristics, such as capacitor-electrode patterns, resistor patterns, etc. may be formed on a ceramic member. In addition, the insulating protective layer may be formed from materials other than a polyimide resin.

As is apparent from the above, according to the present invention, a conductor pattern can be formed while effectively utilizing the surface of a ceramic member because the extension of external electrodes is prevented by grooves formed near the ends of a protective insulating layer covering the conductor pattern, and furthermore, a chip electronic part having stable electrical characteristics can be obtained.

The present invention has been described by way of exemplary embodiments to which it is not limited. Variations and modifications will occur to those skilled in the art without departing from the present invention recited in the claims appended hereto.

What is claimed is:

1. A chip electronic part comprising:
   a ceramic member;
   a conductor pattern located on the surface of said ceramic member;
   an insulating protective layer located on said conductor pattern;
   an external electrode located on at least one end face of said ceramic member and electrically connected to said conductor pattern, said external electrode comprising an undercoating layer formed by dry plating and at least one plating layer formed by wet plating; and
   at least one groove located near an end face of said insulating protective layer delimiting said at least one plating layer.

2. A chip electronic part according to claim 1, wherein said conductor patterns has at least one pattern selected from the group consisting of a coil pattern, a capacitor-electrode pattern, and a resistor pattern.

3. A chip electronic part according to claim 1, wherein said insulating protective layer includes a polyimide resin.

4. A chip electronic part according to claim 1, wherein said at least one groove is located in said insulating protective layer between said end face of said insulating protective layer and an outer edge of said conductor pattern.

5. A chip electronic part according to claim 1, wherein said at least one groove is located in said insulating protective layer at a corner of said chip electronic part.

6. A chip electronic part according to claim 1, further comprising at least one lead electrode electrically connecting said external electrode to said conductor pattern.

* * * * *